Dec. 27, 1966 W. A. CAVAGNARO 3,294,404

TONE ARM AND CARTRIDGE COMBINATION

Filed Dec. 29, 1964

INVENTOR:
WILLIAM A. CAVAGNARO,

BY Thomas A. Briody
HIS ATTORNEY.

United States Patent Office 3,294,404
Patented Dec. 27, 1966

3,294,404

TONE ARM AND CARTRIDGE COMBINATION

William A. Cavagnaro, Decatur, Ill., assignor to General Electric Company, a corporation of New York Filed Dec. 29, 1964, Ser. No. 421,794
8 Claims. (Cl. 274—24)

This invention relates to an improved electro-mechanical transducing assembly for audio reproduction from disc type records, and more particularly to an improved arrangement of a stylus carrying cartridge on a tone arm.

To help protect prior art sound reproducing mechanisms, from possible damage to the pick up cartridge styli and/or records, one commercially successful cartridge arrangement has involved the pivotal arrangement of the cartridge in seesaw fashion on the free end of the tone arm and the conjunctive use of a resilient damping means for cushioning relative movement of the cartridge with respect to the tone arm. It has been found desirable to provide an improved tone arm and cartridge combination of this general type, which is of extremely simplified construction and involves but a minimum number of parts.

Accordingly, an important object of my invention is to provide an improved tone arm and cartridge combination which includes a novel and effective means for pivotally supporting the cartridge on the tone arm.

Another object of this invention is to provide an improved cartridge and tone arm assembly which is of extremely simplified construction and effectively protects the cartridge and/or records from possible damage due to accidental dropping or pressing down on the tone arm in the direction of the record.

A further object of my invention is to provide an improved tone arm and cartridge mechanism which is efficient, dependable, and economical to manufacture.

In accordance with my invention, in one form thereof, there is provided an elongated tone arm pivotally supported at one of its ends for movement about a substantially horizontal axis. Near the other end of the tone arm, a recess is formed in the underside of the tone arm. This recess is located between a pair of opposed tone arm walls having horizontally aligned apertures formed therein. The recess of the tone arm receives an upwardly extending cartridge projection having a horizontally facing aperture formed therethrough. With such an arrangement, for pivotally supporting the pickup cartridge in the tone arm, an elongated handle is extended through the apertures of the opposed walls of the tone arm and through the aperture of the upwardly extending projection of the cartridge, to serve as a bearing support for the pivotal movement of the cartridge relative to the tone arm. The handle of the tone arm thus serves not only as a means for grasping the free end of the tone arm, but also as a simplified pivotal support for the cartridge. Such an approach involves a very small number of parts and is extremely economical in cost.

Further aspects of my invention will become apparent hereinafter, and the specification concludes with claims particularly pointing out and distinctly claiming the subject matter which I regard as my invention. The invention itself, however, both as to organization and method of operation, as well as additional objects and advantages thereof, will best be understood from the following description, when read in conjunction with the accompanying drawing, in which:

Figures 1, 2, 3, 4, 5, 6, 7:
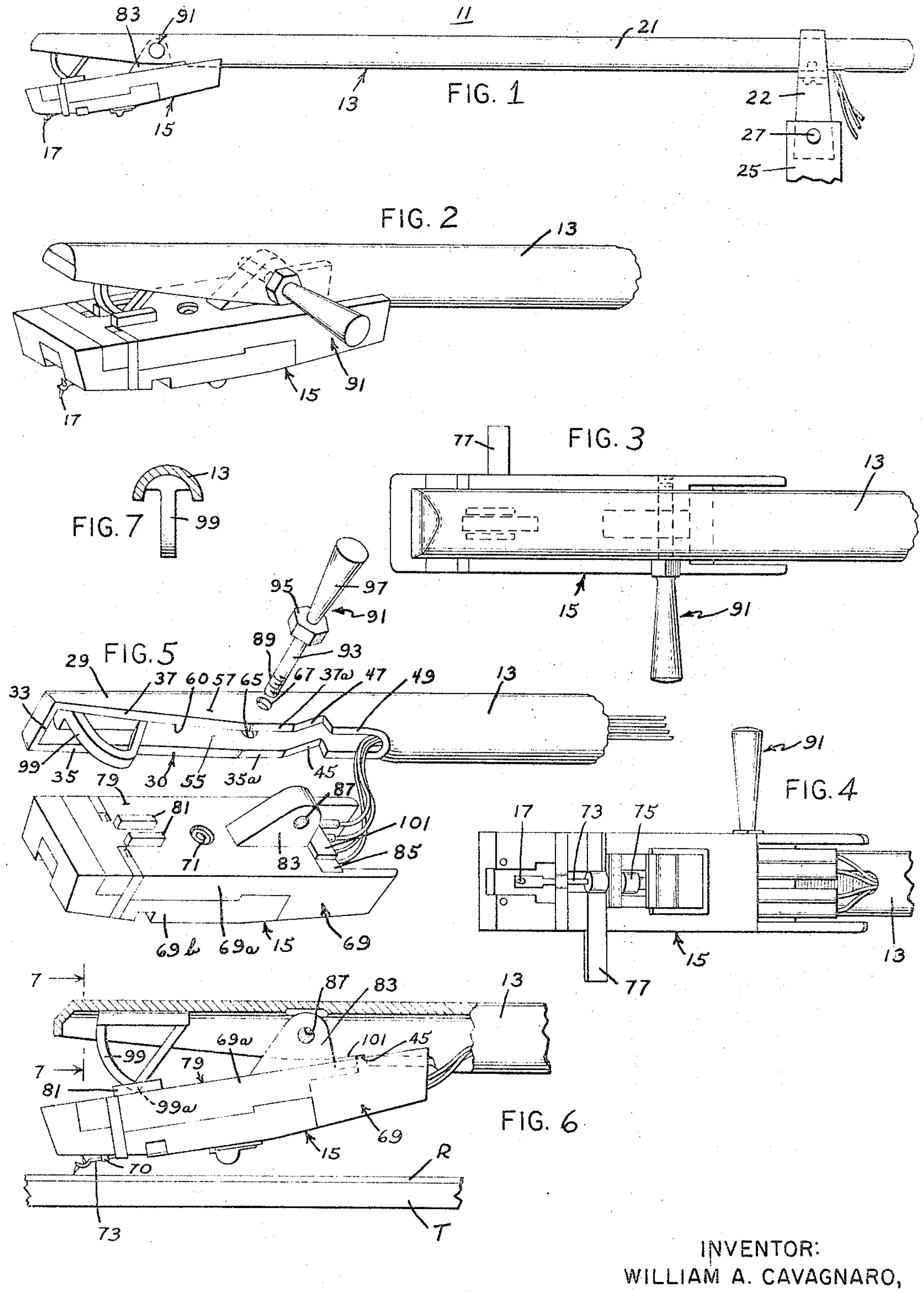
FIGURE 1 is a side elevation view of an improved cartridge and tone arm assembly embodying my invention, the cartridge being shown mounted on the free end of a tubular tone arm.
FIGURE 2 is an enlarged fragmentary perspective view of the cartridge and free end of the tone arm to show further detail thereof.
FIGURE 3 is a fragmentary plan view of the cartridge and tone arm assembly of FIGURE 1, near the free end of the tone arm.
FIGURE 4 is a fragmentary bottom view of the cartridge and tone arm assembly of FIGURE 1, near the free end of the tone arm.
FIGURE 5 is an exploded fragmentary perspective view of the cartridge and the tone arm to show the improved mounting arrangement for the cartridge on the tone arm.
FIGURE 6 is an enlarged fragmentary side elevation view of the cartridge and tone arm, with the free end of the tone arm partially broken away, and showing the record tracking stylus in playing engagement with a record.
FIGURE 7 is a cross-sectional view taken generally along the line 7—7 of FIGURE 6.

Referring first to FIGURES 1–4, there is shown a cartridge and tone arm assembly 11 embodying one form of my invention. The assembly 11 includes an elongated tone arm 13 having a cartridge 15 mounted thereon. The cartridge 15 has at least one stylus 17 adapted to track in the groove of a sound reproducing record R (FIGURE 6).

The tone arm 13 is of generally tubular construction and includes a tubular arm section 21 which extends outwardly in cantilever fashion from the horizontal connecting portion of a U-shaped bracket 22. The arms of bracket 22 are pivotally secured to a suitable support 25 to provide a substantially horizontal tone arm axis 27 about which the tone arm rocks incident to the placing of the tone arm on the record R and lifting the tone arm from the record. The pivoting of the tone arm 13 about the tone arm axis 27 permits a wide range of vertical movement of the tone arm and thereby enables a substantial group of stacked records to be accommodated on the record spindle of an automatic changer without impairing the effective operation of the tone arm assembly 11.

Turning now to an important aspect of the present invention, to enable the cartridge 15 to be pivotally supported on tone arm 13, there is provided near free end 29 of arm 13 a cut-out portion 30 of the tubular tone arm. The cut-out portion 30 is on the bottom side of tone arm 13 near free end 29, and it comprises a generally flat downwardly facing front end edge 33, a pair of inclined and spaced apart coplanar edges 35, 37 which extend downwardly and rearwardly from the front end edge 33 of the tone arm, a pair of generally horizontal edges **35*a* and 37*a* connected respectively to the edges 35, 37, a pair of notched edges 45 and 47 connected respectively to edges 35*a* and 37*a*, and a U-shaped edge 49 the ends of which are connected to the edges 45, 47. It is important to note that each pair of the edges 35, 37; 35*a*, 37*a*; 45, 47; and the sides of U-shaped edge 49; is in generally coplanar relationship and disposed in a plane parallel to the pivotal axis of cartridge 15 on the tone arm. For example, the inclined edges 35 and 37 are in coplanar relationship and disposed in a plane parallel to the pivotal axis of the cartridge 15 relative to tone arm 13**.

It will be further seen from viewing FIGURE 5, that the cut-out portion 30 of the tubular tone arm 13 effectively provides a pair of generally opposed and elongated cylindrical walls 55 and 57 with a recess 60 therebetween. The walls 55 and 57 have a pair of aligned apertures 65 and 67 formed therein, as shown in FIGURE 5. The apertures 65 and 67 are circular and their axes are perpendicular to the longitudinal axis of the tone arm near its free end. It is also preferable that the co-linear axes of the apertures 65 and 67 be on a diameter of the cross section of the tubular tone arm 13.

The cartridge 15 shown is of the ceramic stereo type, and it comprises a housing 69 which may be composed of upper and lower parts **69*a* and 69*b* attached together by one or more rivets 71. The interior of the housing 69 is partly hollow, and contains a pair of elongated ceramic transducer elements (not shown) and a resilient element 70 for coupling these elements to an elongated drive rod 73. The drive rod 73 has the stylus 17 secured to the underside of its free end (FIGURES 4 and 6), and it is secured to a barrel member 75 (FIGURE 4) which is removably located in cartridge 15. The drive rod 73 and barrel member 75 form a stylus assembly for the cartridge unit, the positioning of which may be adjusted by the rotatable manipulation of an arm 77** which is secured to the barrel member.

The top surface 79 of the upper part 69*a* of the cartridge housing, is generally flat, except for the formation thereon of a pair of spaced apart spring positioning ribs 81, an upwardly projecting leaf 83, and rearward transverse step 85. In accordance with an important aspect of my invention, the leaf 83 projects perpendicularly upwardly from the generally horizontal top surface 79 of the cartridge housing. A bearing aperture 87 is formed in leaf 83, as illustrated in FIGURE 5.

For pivotally mounting the cartridge 15 on the tone arm 13, the leaf 83 is positioned in the recess 60 of the tone arm 13 between the opposed cylindrical walls 55, 57, with bearing aperture 87 of leaf 83 generally aligned between the wall apertures 65, 67. The threaded end 89 of a handle 91 is thereupon inserted through tone arm wall aperture 67, cartridge bearing aperture 87 and into threaded engagement with tapped wall aperture 65. The thickness of the leaf 83 of the cartridge housing is sufficiently less than the distance between the inner surfaces of tone arm walls 55, 57 to enable the cartridge 15 to rock on the tone arm 13 about its pivotal horizontal axis with minimal lateral movement of the cartridge relative to the tone arm.

It will thus be seen that the apertured leaf 83 of the cartridge is effectively sandwiched in rockable relationship between the walls 55, 57 of the tone arm and pivotally supported on handle 91. The handle 91 includes shank portion 93 which has threaded end 89 formed thereon, a hexagonal flange 95, and a conically configured handle grip portion 97. When, it is desired to manually position the cartridge 15 with respect to the turntable T and/or a record R, the handle grip portion 97, which extends laterally outwardly from wall 57 of the tone arm, may be readily grasped by the operator.

For resiliently cushioning the pivotal movement of cartridge 15 with respect to its tubular tone arm 13, a triangularly shaped resilient damping element 99 of rubber-like material is suitably secured to the underside of the front end of tone arm 13, as shown in FIGURE 6, and a damping pad 101 also of rubber-like material is positioned on transverse step 85 of the cartridge housing. Corner portion 99*a* of the damping element 99 acts upon top surface 79 of the cartridge housing between parallel ribs 81 to provide a continuous shock absorbing effect for protecting the cartridge and its components as well as records being played, during the normal operation of the phonograph and tone arm cartridge assembly. To help further this damping action, and maintain the damping element 99 in continuous compression between the tone arm and cartridge, the block shaped damping pad 101 resiliently coacts with notched edges 45 and 47 of the cut-out portion of the tone arm. From viewing FIGURE 6, it will thus be seen that pad 101 coacts with notched edges 45, 47 to provide a resilient stop for limiting counterclockwise movement of the cartridge relative to the tone arm.

It will now, therefore, be seen that my new and improved tone arm and cartridge combination provides a simplified and effective construction for pivotally mounting the cartridge on the tone arm. It will be further understood that my improved arrangement represents an efficiently operable overall tone arm and cartridge combination.

While in accordance with the patent statutes, I have described what at present is considered to be the preferred embodiment of my invention, it will be obvious to those skilled in the art that various changes and modifications may be made therein without departing from the invention and I, therefore, aim in the following claims to cover all such equivalent variations as fall within the true spirit and scope of the invention.

What I claim as new and desire to secure by Letters Patent of the United States is:

1. A tone arm and cartridge assembly comprising an elongated tone arm, a handle removably secured to said tone arm near its free end, said handle including a manually graspable portion projecting from said tone arm for enabling an operator to manually move said tone arm relative to a turntable, said handle also including a second portion, and a pickup cartridge arranged for disposition on said tone arm near its free end, said cartridge including a housing having a bearing aperture formed therein, said bearing aperture of said cartridge receiving the second portion of said handle for pivotally supporting the cartridge on the tone arm, whereby said handle serves both as an operating element for manipulating said tone arm and as a pivotal support for said cartridge.

2. A tone arm and cartridge assembly comprising an elongated tone arm having a free end portion, a pickup cartridge arranged for disposition on said tone arm at its free end portion, a handle disposed near the free end of said tone arm and removably supported on said assembly, said handle including a manually engageable first portion and a second portion connected to said first portion, said first portion of said handle projecting outwardly from said tone arm for enabling an operator to manually move said tone arm relative to a turntable, and means including the second portion of said handle and said cartridge for pivotally supporting the picking cartridge on said tone arm.

3. The tone arm and cartridge assembly as described in claim 2 wherein an end of said handle opposite said manually engageable portion is threaded into removable engagement with said assembly so that when said handle end is disengaged from said assembly the pickup cartridge is uncoupled from its pivotally supported engagement with the second portion of said handle.

4. A tone arm and cartridge assembly comprising an elongated tone arm, a recess formed in the underside of said tone arm near its free end, a handle secured to said tone arm near its free end, said handle including a manually engageable external portion, and an internal portion traversing said recess, and a pickup cartridge arranged for disposition on said tone arm near its free end, said cartridge including a housing having a leaf portion extending upwardly from the top thereof, and a bearing aperture formed in said leaf for receiving the internal portion of said handle therethrough, thereby to pivotally support said leaf of said cartridge in the recess of said tone arm.

5. A tone arm and cartridge assembly as described in claim 4 wherein the tone arm is of tubular construction and has a portion near its front end cut-out thereby to form said recess.

6. A tone arm and cartridge assembly as described in claim 4 wherein the tone arm is of cylindrically tubular construction and has said handle located on an axis diametrical to the cross-section of said tone arm.

7. A tone arm and cartridge assembly comprising an elongated tubular tone arm, an elongated handle secured to said tone arm near its free end, said handle including a manually engageable portion for enabling an operator to readily move said tone arm relative to said turntable, said handle also including a bearing axle portion extending generally perpendicularly to the longitudinal axis of the free end of the tone arm, and a pickup cartridge arranged for disposition on said tone arm near its free end, said cartridge including an upward appendage having a bearing aperture formed therein, said bearing aperture of said cartridge appendage receiving and cooperating with the bearing axle portion of said handle for pivotally supporting the cartridge on the tone arm, and means for resiliently damping the pivotal action of said cartridge on said handle relative to said tone arm.

8. The tone arm and cartridge assembly as described in claim 7 wherein the resilient damping means comprises two elements of rubber-like material, one of said elements being arranged for compressible engagement between said tone arm and said cartridge on one side of the axis of rotation of said cartridge relative to said tone arm, the other of said elements being arranged for compressible engagement between said tone arm and said cartridge on the other side of said axis of rotation.

References Cited by the Examiner

UNITED STATES PATENTS

| | | | |
|---|---|---|---|
| 2,485,137 | 10/1949 | Brown | 274—24 |
| 2,643,886 | 6/1953 | Ghilini | 274—24 X |
| 3,204,968 | 9/1965 | Hammond | 274—23 X |

FOREIGN PATENTS

| | | |
|---|---|---|
| 260,626 | 8/1949 | Switzerland. |

JOHN M. HORAN, *Primary Examiner.*

CLIFFORD B. PRICE, *Examiner.*